(12) United States Patent
Gelonese

(10) Patent No.: US 10,348,999 B2
(45) Date of Patent: Jul. 9, 2019

(54) STANDBY POWER CONTROLLER WITH TIMER AND DIFFERENTIATED USAGE DETECTION

(71) Applicant: Embertec Pty Ltd, Dulwich, South Australia (AU)

(72) Inventor: Domenico Gelonese, Dulwich (AU)

(73) Assignee: Embertec Pty Ltd (AU)

(*) Notice: Subject to any disclaimer, the term of this patent is extended or adjusted under 35 U.S.C. 154(b) by 0 days.

(21) Appl. No.: 15/789,071

(22) Filed: Oct. 20, 2017

(65) Prior Publication Data

US 2019/0007644 A1 Jan. 3, 2019

(30) Foreign Application Priority Data

Jun. 29, 2017 (AU) .................................. 2017902513

(51) Int. Cl.
| | | |
|---|---|---|
| G08B 21/00 | (2006.01) | |
| H04N 5/63 | (2006.01) | |
| H04N 21/443 | (2011.01) | |
| H04N 21/442 | (2011.01) | |
| H04N 5/44 | (2011.01) | |

(52) U.S. Cl.
CPC ........... H04N 5/63 (2013.01); H04N 21/4436 (2013.01); H04N 21/44218 (2013.01); H04N 5/4403 (2013.01)

(58) Field of Classification Search
CPC .............................. H04Q 2209/60; H04Q 9/00
USPC .................................................... 340/870.07
See application file for complete search history.

(56) References Cited

U.S. PATENT DOCUMENTS

| | | | |
|---|---|---|---|
| 7,622,822 B2 | 11/2009 | Gelonese | |
| 8,190,940 B2 | 5/2012 | Gelonese | |
| 8,301,914 B2 | 10/2012 | Gelonese | |
| D700,579 S | 3/2014 | Mobbs | |
| 8,963,086 B2 | 2/2015 | Gelonese et al. | |
| D726,107 S | 4/2015 | Mudge et al. | |
| 9,106,099 B2 | 8/2015 | Gelonese | |
| D753,063 S | 4/2016 | Gelonese et al. | |
| 9,703,349 B2 | 7/2017 | Gelonese | |
| 2002/0067306 A1* | 6/2002 | Ishigaki | G01S 19/34 342/357.74 |
| 2006/0155395 A1* | 7/2006 | Lim | G05B 19/042 700/22 |
| 2008/0106148 A1 | 5/2008 | Gelonese | |
| 2009/0235107 A1 | 9/2009 | Gelonese | |

(Continued)

FOREIGN PATENT DOCUMENTS

| | | |
|---|---|---|
| AU | 2011101402 A4 | 12/2011 |
| AU | 2012100197 A4 | 3/2012 |

(Continued)

*Primary Examiner* — Mark S Rushing
(74) *Attorney, Agent, or Firm* — Craig A. Fleschko, Esq.; DeWitt LLP

(57) ABSTRACT

A standby power controller (SPC) supplies power to an appliance such as a television, and cuts power to the appliance if the appliance is going unused. The SPC includes occupancy sensors and remote control usage sensors, and a switch which controls power to the appliance in dependence on the detection status of the sensors, and also preferably in dependence on the prior detection status of the remote control usage sensor at one or more points of time in the past.

14 Claims, 3 Drawing Sheets

(56) References Cited

U.S. PATENT DOCUMENTS

| | | | |
|---|---|---|---|
| 2010/0194358 A1* | 8/2010 | Stanford-Clark | H02J 9/005 |
| | | | 323/234 |
| 2013/0262888 A1* | 10/2013 | Scott | G06F 1/3209 |
| | | | 713/310 |
| 2014/0285019 A1 | 9/2014 | Gelonese | |
| 2014/0292289 A1 | 10/2014 | Gelonese | |
| 2014/0310744 A1 | 10/2014 | Gelonese | |
| 2015/0039429 A1 | 2/2015 | Gelonese | |
| 2015/0137621 A1 | 5/2015 | Emby | |
| 2015/0195649 A1* | 7/2015 | Vogt | G08C 17/02 |
| | | | 340/4.42 |
| 2015/0256032 A1 | 9/2015 | Gatto | |
| 2015/0338238 A1 | 11/2015 | Gelonese | |
| 2015/0349532 A1 | 12/2015 | Gelonese | |
| 2016/0062440 A1 | 3/2016 | Gelonese et al. | |
| 2016/0099571 A1 | 4/2016 | Gelonese | |
| 2016/0190748 A1 | 6/2016 | Emby | |
| 2016/0215960 A1 | 7/2016 | Gelonese et al. | |
| 2016/0223601 A1 | 8/2016 | Gelonese | |
| 2016/0370834 A1 | 12/2016 | Gelonese | |
| 2016/0370836 A1 | 12/2016 | Gelonese | |
| 2017/0013227 A1 | 1/2017 | Gelonese | |
| 2017/0131332 A1 | 5/2017 | Gelonese | |

FOREIGN PATENT DOCUMENTS

| | | |
|---|---|---|
| AU | 2016204730 A1 | 7/2016 |
| EP | 1223752 A2 | 7/2002 |
| WO | WO 2016/040980 A1 | 3/2016 |
| WO | WO 2016/081982 A1 | 6/2016 |
| WO | WO 2016/115589 A1 | 7/2016 |
| WO | WO 2016/115590 A1 | 7/2016 |
| WO | WO 2016/119008 A1 | 8/2016 |
| WO | WO 2016/138551 A1 | 9/2016 |
| WO | WO 2016/141412 A1 | 9/2016 |

* cited by examiner

STANDBY POWER CONTROLLER WITH TIMER AND DIFFERENTIATED USAGE DETECTION

FIELD OF THE INVENTION

This invention relates to a standby power controller including at least two user detection sensors, where detection by each sensor may result in different outcomes.

BACKGROUND OF THE INVENTION

The following references to and descriptions of prior products or other matter are not intended to be, and are not to be construed as, statements or admissions of common general knowledge in the art. In particular, the following prior art discussion does not relate to what is commonly or well known by the person skilled in the art, but may assist in the understanding of the present invention.

There is currently world-wide concern about the level of use of electrical energy for both domestic and commercial purposes. In part this concern is based on the greenhouse gas production associated with the generation of electrical energy, and the contribution of that greenhouse gas to anthropogenic global warming. There is also a concern for the capital cost involved in building the electricity generating plants and electricity distribution networks required to generate and distribute an increasing amount of electricity.

A significant contributor to the energy use of households is the audio visual equipment including multiple devices such as televisions, television decoders, television recorders and sound equipment now found in virtually all homes.

SUMMARY OF THE INVENTION

The invention involves a standby power controller including:
a first sensor that detects a first indication of user activity;
a second sensor that detects a second indication of user activity;
a switch that controls a supply of electricity to at least one appliance, preferably a television;
a timer configured to count in time toward a selected timer value;
the switch operating to remove the supply of electricity upon the timer reaching the selected timer value;
wherein the timer will increase and decrease in value in response to the detection status of the first and second sensors.

The first sensor preferably detects use of a remote control device which controls at least some functions of the appliance.

The second sensor preferably detects occupancy by a human in the vicinity of the appliance, i.e., within about 25 feet of the appliance. The second sensor may be a detector of any kind which detects any parameter which may be a proxy for human occupancy, and is preferably a motion detector.

An absence of detection by a selected one of the first and second sensors preferably results in the timer value changing such that the time until the timer will reach the selected timer value is decreased.

The appliance is preferably a television, and the first sensor preferably detects use of an infra-red remote control which controls the television, and/or the first sensor detects use of a radio frequency remote control which controls at least one of the television and a set top box providing a video signal to the television.

A power sensor preferably senses the power drawn by the appliance, and the switch is operated to remove the supply of electricity from the appliance when the sensed power indicates that the appliance is in a low power standby state.

When the timer approaches the selected timer value to within a predefined remaining time interval (a shutdown warning period), a visual or aural warning of the imminent operation of the switch is preferably provided.

Detection by the first sensor during the warning time period preferably causes the timer to be reset to an initial value. Detection by the second sensor during the warning time period preferably causes the timer to be adjusted by an adjustment amount, the adjustment amount being such that the time remaining until the selected timer value is reached is less than the time remaining until the selected timer value is reached when the timer is reset to the initial value.

The adjustment amount is preferably varied where detection by the first sensor has occurred in the period since the standby power controller was initialized.

The invention also involves a standby power controller including:
a first sensor configured to detect a first indication of user activity;
a second sensor configured to detect a second indication of user activity; and
a switch configured to control a supply of electricity to at least one appliance;
wherein the first sensor detects use of a remote control device which controls the appliance, and the second sensor detects motion in the vicinity of the appliance,
further including a timer configured to: count in time toward a selected timer value; trigger the off state of the switch if neither remote control device use nor motion in the vicinity of the appliance are detected during the time leading up to the selected timer value; restart the timer's counting in time if remote control device use is detected; and increase the time until the selected timer value will be reached by an amount less than occurs when the timer's counting is reset, if motion in the vicinity of the appliance is detected.

The switch is preferably placed in the off state when the timer attains the selected timer value.

The timer is preferably further configured to restart the timer's counting in time if the timer has counted time which approaches the selected timer value to within a predefined remaining time interval, wherein the predefined remaining time interval is less than the selected timer value, and remote control device use is detected within the predefined remaining time interval.

The timer is preferably further configured to adjust the timer's count by an adjustment amount such that the time remaining until the selected timer value is reached is greater than the predefined remaining time interval but less than the restart time when motion in the vicinity of the appliance is detected within the predefined remaining time interval.

Preferably the adjustment amount is varied if remote control device use has previously been detected by the standby power controller.

BRIEF DESCRIPTION OF THE DRAWINGS

Exemplary versions of the invention will now be described with reference to the accompanying drawings, in which.

DETAILED DESCRIPTION OF THE DRAWINGS

Figure 1:
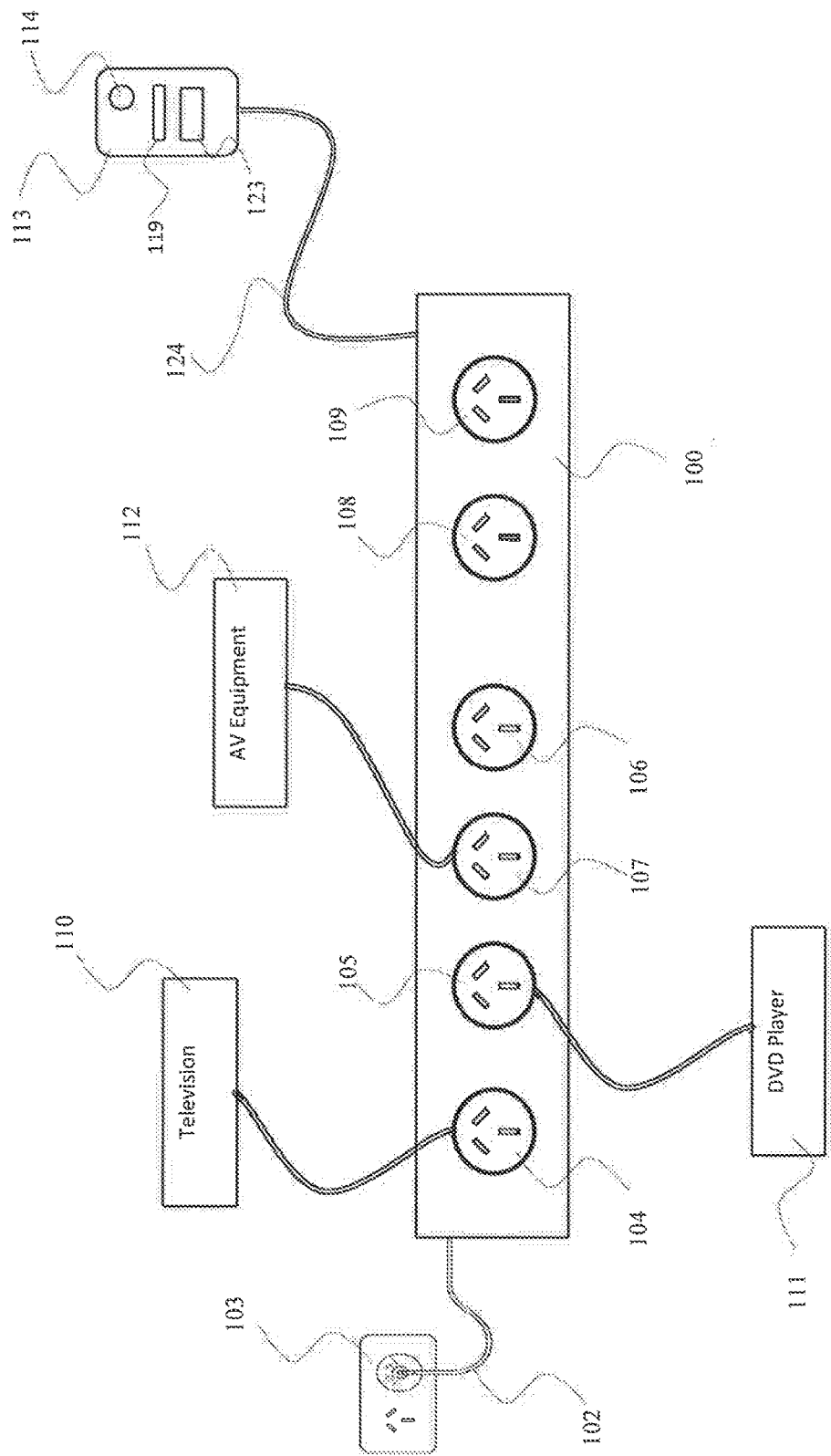
FIG. 1 shows a representation of a standby power controller incorporating the invention.

FIG. 1 is a general representation of an installation including a standby power controller (SPC) exemplifying the invention, and is illustrative only. It is not intended to limit the number or configuration of continually powered or switched or monitored main outlets, or of communication interfaces or other functional modules.

FIG. 1 schematically illustrates an energy saving device in the form of a standby power controller (SPC) 100. An SPC is an energy saving device which is installed between the mains power supply and an electrical device. Electrical devices such as AV equipment are commonly "turned off" by being changed to a low power standby power state, which reduces, but does not eliminate, power consumption. Energy savings may be achieved by powering these types of devices by plugging them into an SPC. When the SPC detects that the equipment has entered a standby state, the SPC removes power from at least some of the equipment.

When a main device, for example a television, is in a standby state, it is desirable to remove power from the main device and any associated electrical devices. This is common where there is a subset of electrical devices such as televisions, video equipment, personal video recorders (digital video recorders), CD players, stereo systems, amplifiers, pay-television boxes, and other AV equipment grouped in close proximity and often used in combination with each other. The standby power controller (SPC) may also be equipped to remove power when all or a subset of the devices powered through it are in a standby state.

The standby power controller (SPC) 100 of FIG. 1 is adapted for use with AV equipment. The SPC 100 receives electrical power from a General Purpose Outlet 103 via power cord 102.

The standby power controller (SPC) 100 includes Monitored and Controlled Outlets 104, 105, 106, and 107. The SPC 100 also includes Uncontrolled Outlets 108 and 109. In general, any number of Monitored and Controlled Outlets and Uncontrolled Outlets may be provided. The Uncontrolled Outlets may be absent.

Monitored and Controlled Outlet 104 supplies electrical power to a television 110. Further Monitored and Controlled Outlets 105, 106 may provide electrical power to other audio-visual equipment, for example a DVD player 111 and audio equipment 112. If desired, multiple devices may be powered from any or each of the Monitored and Controlled Outlets using a powerstrip.

The standby power controller (SPC) 100 includes a Sensing and Communications Unit 113. In a preferred version of the invention, the Sensing and Communications Unit 113 is in data communication with the body of the SPC 100 via cable 124, which may also provide power to the Sensing and Communications Unit 113.

Modern television sets and other audio visual equipment, when turned "off" by a remote control, enter a low power standby state in which energy is still consumed, although at a significantly lower level that when the device is nominally "on". When a television 110 is in this low power standby state it is not in use, and the power supply to it may be cut to save energy.

It is also the case that television sets may be left on for extended periods when no user is viewing the screen. This may happen when a user falls asleep in front of the television 110, or when a user, particularly a child or a teenager, simply leaves the vicinity of the television 110 without turning the television 110 off. This state may be termed "active standby". In this state the television 110 is not in use, and the power supply to it may be cut to save energy. Where a television is on and being viewed by a user, it may be referred to as being in "active use".

The standby power controller (SPC) 100 may detect that the television 110 has entered a standby state of either kind by any convenient means, or combination of means.

In order to save energy, the standby power controller (SPC) 100 operates to remove the power supply from Monitored and Controlled Outlet 104, and hence from the attached television 110, whenever the television 110 is detected to not be in use, whether in a low power standby state or an active standby state. Power may also be removed from all other Controlled Outlets 105, 106, 107 since the devices powered through those outlets may only be in use only when the television 110 is in use. When power is removed from the Monitored and Controlled Outlets 104, 105, 106, 107 because the television 110 is in active standby, this action is termed Active Powerdown.

The standby power controller (SPC) 100 may include a power sensor configured to sense the power drawn through a Monitored and Controlled Outlet 104, 105, 106, 107. The power sensor detects characteristics of the power flow through the outlet. When the characteristic is such as to indicate that the television 110 is in a low power standby state, the power to the Monitored and Controlled Outlet 104, and hence to the attached television 110 or monitor, is interrupted.

The standby power controller (SPC) 100 may include any number of Monitored and Controlled Outlets 104, 105, 106, 107, which may be monitored and controlled individually or together. Monitored outlets are those outlets where the power drawn through the outlet is monitored by a power sensor. Controlled outlets are those where power is supplied to the outlet through a switch, wherein the switch can be controlled to remove power from the controlled outlet when the television is determined to be in a standby state The standby power controller (SPC) 100 includes means to detect that a user is interacting with the audio visual equipment 112 and/or the television 110. The sensing and communications unit 113 includes a remote control use sensor 119, for example, an infra-red sensor. This sensor 119 receives infra-red signals from a remote control associated with the television 110 or with other connected AV equipment 112.

It is likely that a user, when actively watching television 110, will periodically use the remote control to change channels, adjust volume, mute commercials, etc. Thus, a remote control signal receiver, such as infra-red sensor 119, can be used as a remote control use sensor. If no remote control activity is detected by the infra-red sensor 119 for a period of time, it can be assumed that the television 110 is not in use, and the power supply to the Monitored and Controlled Outlet 104, and hence to the television 110, may be interrupted. This may be achieved by using a countdown timer which starts from a specific initial value equal to a particular time period, say one hour, and having this countdown timer continuously decrement. Each detected use of the remote control will reset the countdown timer to the initial value. When the countdown time reaches zero, there has been no remote control activity for the time period, and the television 116 is therefore assumed not to be in active use, that is, to be in an active standby state. Thus, the electricity supply to the Monitored and Controlled Outlet 104, and hence to the television 110, is interrupted. In a preferred version of the invention, the supply of electricity to all Monitored and Controlled Outlets 104, 105, 106, 107 is interrupted at the same time.

A user using the remote control may be assumed to be engaged with the television, and actively watching the television. The simple presence of a user, without the use of a remote control, may indicate that the television is in active use, but this cannot always be assumed to be the case.

The determination that the television 110 is in an active standby state may be modified by determining that a user is present in the vicinity of the television 110. Any suitable user presence sensor may be used for determining that a user is present. These include, without limitation, passive infrared sensors, ultrasonic sensors, cameras, any other passive or active movement sensors, and sound detectors. Such sensors may also be called occupancy sensors.

The standby power controller (SPC) 100 of FIG. 1 includes motion sensor 123. The detection status of the motion sensor 123, such as whether it is detecting motion, or whether it has detected motion in some past period, is combined with the detection status of the remote control use sensor 119 to allow a better determination of active standby status, as described further below.

Occupancy sensors may be used to detect the presence of a person in the vicinity of the television, and to infer from that presence that the television is in active use. Occupancy detectors may thus help to avoid false positives, that is, determining that the television 110 is in active standby and not in use when the television 110 is in fact in use, by a user who is not making regular use of a remote control which is able to be detected by the SPC.

A particular instance where the occupancy sensor is of value for avoiding false positives is the case where a remote control or remote controls are in use which use more than one transmission technology, for example infra-red and radio frequency signals, only one of which can be detected by the SPC. This reduces the number of remote control use activities which can be detected by the SPC, increasing the likelihood of false positives. However, each use of the remote control is likely to involve movement, so a motion detector is more likely to be activated. An example of this is a set top box remote control which uses infra-red signalling to control power to the television, and the volume of the television, but uses radio frequency signalling for all other commands, in combination with an SPC which detects only infra-red signals.

The occupancy sensor is useful in other circumstances including but not limited to the situation where a user is using a remote control, every signal of which is detectable by the type of sensor in the SPC, but the use is watching a movie or other program which does not require use of the remote control within the countdown time.

However, the inference of active use from presence is not as likely to be valid as the inference of active use which may be drawn from the detection of use of a remote control device. People may be detected as being in the presence of the television who are not actively watching the television. Where such detection is used by the SPC to determine that the television is in active use, when the television is actually not in use, such a detection is a false negative, with the SPC determining that the television is not in active standby when it is in fact in active standby, that is, fully powered but with no one watching the television. Occupancy sensors are also subject to false negative detections by detecting such things as pets or curtains moving. The effect of a false negative detection is that the television is determined to be in active use and power continues to be supplied to the controlled outlets, when it would be acceptable for the monitored outlets to have power withdrawn. False negative detections therefore reduce the power savings which can be achieved by installation of the SPC.

In order to reduce the impact of false negative detections from occupancy sensors, active use determinations based on occupancy sensor detections may be treated differently from active use determinations based on remote control use detections. As an example, the countdown timer might be increased by a fixed amount when the occupancy sensor operates, but the countdown timer is then reset to the full original value when the remote control use sensor operates.

Detection of occupancy and detection of remote control use may interact. As an example, a lack of occupancy detection for a defined period might cause the countdown timer to be decremented so that the period which must elapse before power is withdrawn from the controlled outlets is reduced.

Whatever means is used to determine that the television 110 is on, but not in use, it is unlikely to be completely free of false positives, that is, determining that the television 110 is in active standby and not in use when the television 110 is in fact in use. If the television 110 is turned off when a user is still watching a program, the user will be irritated. Repeated occurrences are likely to lead to the user bypassing the power control function of the standby power controller (SPC) 100, thereby preventing power savings and thwarting the SPC's objectives.

The Sensing and Communications Unit 113 includes a warning indicator 114, e.g., a warning LED. When the standby power controller (SPC) 100 determines that the television 110 is in active standby, the warning LED 114 will flash to alert any user to the imminent shutdown of the power to the television 110. This time between the determination that the television 110 is in active standby, and the shutdown of the television 110, is the Shutdown Warning Period. In a preferred version of the invention this is ten minutes, but any other suitable time period may be chosen. In the case where there is a false positive, that is, there is a user watching the television 110, the user may react to observing the flashing of the warning LED 114 by pressing a key on the remote control and/or by moving. The signal from the remote control is detected by the remote control use sensor 119, and/or the movement is detected by motion sensor 123, in reaction to such detection, the SPC 100 causes the countdown timer to be reset, preventing interruption of power to the television 110.

In lieu of the warning LED 114, other methods for warning of imminent shutdown of power to the television 110, such as an audible warning tone, may be used.

The standby power controller (SPC) 100 may include software allowing control of the warning mechanism. For example, the brightness of the LED 114, and/or the Shutdown Warning Period, may be adjustable. It may be possible to set times when the warning should take certain forms. For example, an audible warning may be used at certain times of the day, while the LED 114 is used at other times, or both may be used together at given times. At still further times, no warning at all may be given.

Uncontrolled Outlets 108 and 109 are optionally provided to allow power to be supplied to devices which should not have the power supply cut when the television 110 is not in use. Each Uncontrolled Outlet 108/109 supplies power at all times when the standby power controller (SPC) 100 is plugged in. Any number of Uncontrolled Outlets may be provided.

Devices other than a television 110 may be connected to the Monitored and Controlled Outlets 104, 105, 106, 107 along with a television 110. In this case, the total load of all devices may be monitored for the characteristics indicating that all devices so connected are in a low power standby or unused state.

One or more of a third type of power outlet (not shown) may be provided. This non-monitored, controlled outlet is not monitored by the power sensor, so the power drawn by any load connected to the outlet does not contribute to the determination that the monitored load is in a low power standby or unused state. This outlet is controlled, such that when power is interrupted to the Monitored and Controlled Outlets 104, 105, 106, and 107, power is also interrupted to this outlet.

A fourth (and optional) type of outlet (not illustrated) is monitored, but not controlled. The power drawn through this outlet contributes to the determination that the monitored load is in a low power standby or unused state. However, the standby power controller (SPC) 100 does not interrupt power to this outlet. This is similar to the "master" outlet in a standard "master/slave" SPC, known in the art as a Tier 1 SPC.

When the standby power controller (SPC) 100 removes power from the Monitored and Controlled Outlets 104, 105, 106, and 107, power is removed from the television 110. The television 110 is in a completely unpowered state, rather than the low power standby state which the television 110 would enter if switched off using the remote control. This means that the television 110 is unable to monitor for use of the remote control in order to be turned on. While power is cut off from the television 110 by the standby power controller (SPC) 100, use of the remote control will be detected by the SPC 100. Typically, a user will seek to turn on the television 110 using the remote control. This will be detected by the SPC 100, and a switch within the SPC 100 will be activated to return power to the television 110. The television 110 will receive power, and may then enter a low power standby state. Further use of the remote control may then be required to return the television 110 to a fully active state.

Figure 2:
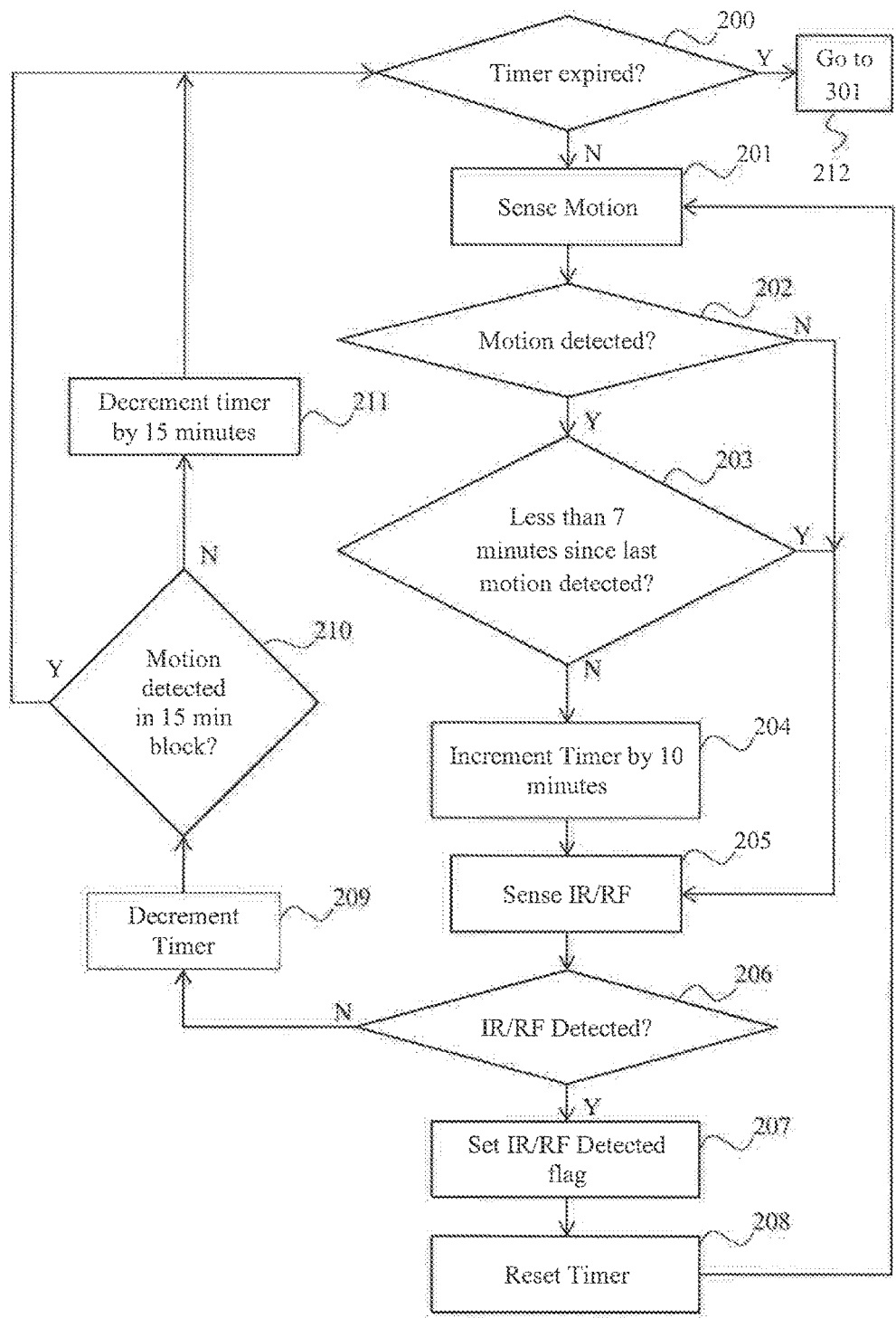
FIG. 2 shows a flowchart of the function of the invention during viewing mode.

FIG. 2 shows a flowchart of the exemplary operation of a SPC such as that illustrated in FIG. 1 during a viewing mode of operation. Viewing mode is the normal operational state of the SPC, where power is supplied to the controlled outlets. Power is supplied to the television, which is in a fully active state. Remote control use and occupancy detectors are operational.

The flowchart of FIG. 2 describes the high level flow of the operation of the SPC in viewing mode. At start-up, a countdown timer is initiated to an initial value. The operational flow then checks at 200 whether the countdown timer has expired. In the case where the timer has expired, this indicates that the television is determined to be in an active standby state. Operation flow transfers to 301 of FIG. 3, and a warning period commences, indicating to a user that removal of power from the controlled outlets is imminent.

In the case where the countdown timer has not expired, a check for occupancy of the vicinity of the television is made. In FIG. 2, this is the step Sense Motion 201. The SPC includes or is in data communication with a motion sensor, which detects movement in an area around the television. Movement may imply the presence of a person in the area, which may imply that the television is in use. The output of the motion sensor is checked at step 202, Motion Detected?

Where motion is detected, operation continues at step 203. At step 203, a check is made as to how much time has elapsed since the most recent previous motion detection event. Where that time is more than seven minutes, this is considered to be a new motion detection event and the countdown timer is incremented by ten minutes at step 204. If the timer increment would cause the timer value to exceed the initial timer value, the timer is only incremented to that initial value.

Motion alone is not a completely reliable indicator of the presence of a human in the viewing area of the television. Motion detection may be caused by pets or curtains or may be detection of movement within the range of the motion detector, but outside the television viewing area. The presence of a human in the viewing area of a television that is on and displaying video is not a completely reliable indicator that the television is in active use. The human may not be watching the television. The television may be in active standby. For this reason, detection of motion indicates a likelihood that the television is in active use, but with less certainty than detection of remote control use. That is, false negative determinations of active use are more likely when motion detection is the criteria for determination of active use. Accordingly, the response to such a determination of active use based on the detection of motion is to delay the removal of power from the controlled outlets by a short time period, in the illustrated embodiment, ten minutes. Other delay periods may be used in other versions of the invention. The countdown timer will not be incremented to a value greater than the initial value to which the countdown timer is initially set.

An individual movement event is likely to cause multiple detections by a motion detector. For example, a user reaching for a remote control, or a user walking into a room and sitting down, are each a single movement event from the user's viewpoint. However, because of the time taken to make each movement, it is likely that a detector will make multiple consecutive detections for each such user movement event.

If each detection by the motion detector is taken as a separate motion detection event, the countdown timer would be incremented several times for each movement event. To prevent this, a minimum interval is inserted between each increment of the countdown timer. In FIG. 2, this minimum interval is seven minutes, but other values, less than the initial timer value, may be chosen. This interval insertion is made at step 203, which causes motion detections subsequent to a first detection to be ignored if the subsequent detection is within a period of seven minutes from the first detection.

After incrementing the timer at step 204, or after determining at step 203 that less than seven minutes has elapsed since the most recent motion detection event, operation continues at step 205. At step 205, the use of a remote control device for the television or an associated device is sensed. For example, infra-red or radio frequency radiation indicative of use of a remote control may be sensed. Either or both of infra-red or radio frequency radiation may be detected. At step 206, the output of the remote control use detector is checked. Following the foregoing example, this may be a check for infra-red or RF radiation associated with a remote control for the television or associated equipment.

In other versions of the invention, the steps of sensing and checking for remote control use, steps 204 and 205, include analysis of infra-red or radio frequency signals to determine that the signal came from a remote control device, and may include analysis to determine that the signal came from a specific remote control device associated with the television or with a device associated with the television. Any suitable method of detecting remote control of the television or associated devices may be used, including, without limitation, direct data communication with the remote control device, the television, or the television associated device.

Where the check for IR or RF at 206 indicates that no detection has been made, operation continues at step 209. At step 209, the countdown timer is decremented. The lack of detection of use of a remote control, which would indicate user engagement with the television, means that it is possible that the television is in active standby. Should the television be in active standby, a determination of this status takes place only when the countdown timer reaches zero. Decrementing the timer brings this determination closer.

As discussed above, occupancy detection detecting the apparent presence of a human in the vicinity of the television is not a reliable indicator that the television is in active use. Where the occupancy detector is a motion detector, detection by the motion detector may not actually indicate the presence of a human.

Negative occupancy detection is a better indicator that the television is in active standby. The lack of detection of motion in the illustrated embodiment increases the likelihood that the television is in active standby. The more quickly a determination that the television is in active standby can be made, the more quickly power can be removed from the controlled outlets, and the greater the energy savings.

Motion detection events are recorded in event detection blocks of (for example) fifteen minutes. In each consecutive fifteen minute block from the time that the countdown timer is initially set or is reset, a record is made if a motion detection event has occurred. Where a detection event does not occur in a fifteen minute event detection block, the countdown timer is decremented by an occupancy non-detection amount, in FIG. 2, fifteen minutes. However, other time periods may be used for the event detection block and for the occupancy non-detection amount. The event detection block and the occupancy non-detection amount are not required to be the same length of time.

Following the decrementing of the countdown timer at step 209, a check is made at step 210 as to whether motion has been detected in the immediately previous event detection block. Where no such detection has occurred, the countdown timer is decremented by fifteen minutes. Operation then returns to step 200, checking whether the timer has expired. Where motion has been detected in the immediately previous event detection block, operation returns to step 200, checking whether the timer has expired. This step 210 occurs only once for each event detection block.

Where user remote control use is detected at step 206, that is, infra-red or radio frequency radiation associated with remote control use is detected, a flag IR/RF Detected is set at step 207. Once set, this flag remains set until the SPC is reinitialized. The value of this flag is used to determine the behavior of the SPC during a Shutdown Warning Period, as further described below.

With remote control use having been detected, the television is determined to be in active use. At step 208, the countdown timer is reset to the initial value, and operation returns to motion sensing at step 201.

Step 203 may be replaced with a step disabling the motion detector for the interval period, seven minutes in this case. In this arrangement, while the motion detector is disabled, the check for motion detection at step 202 will always indicate that no motion has been detected, and thus step 204, incrementing the timer by ten minutes, will not occur.

In FIG. 2, the initial value is a starting value, and the countdown timer counts down to zero. In other versions of the invention, the initial value could be a terminal value, where the timer is a count-up timer which starts at zero and counts up to the terminal value.

The person skilled in the art will appreciate that the order of the process steps shown in FIG. 2 is not essential to the invention. As examples, the sensing of occupancy and the sensing of remote control use may occur simultaneously or in reverse order to that shown on FIG. 2. As other examples, the determination of occupancy detection within an event detection block may also occur in any order, or in parallel with remote control use and occupancy sensing.

Figure 3:
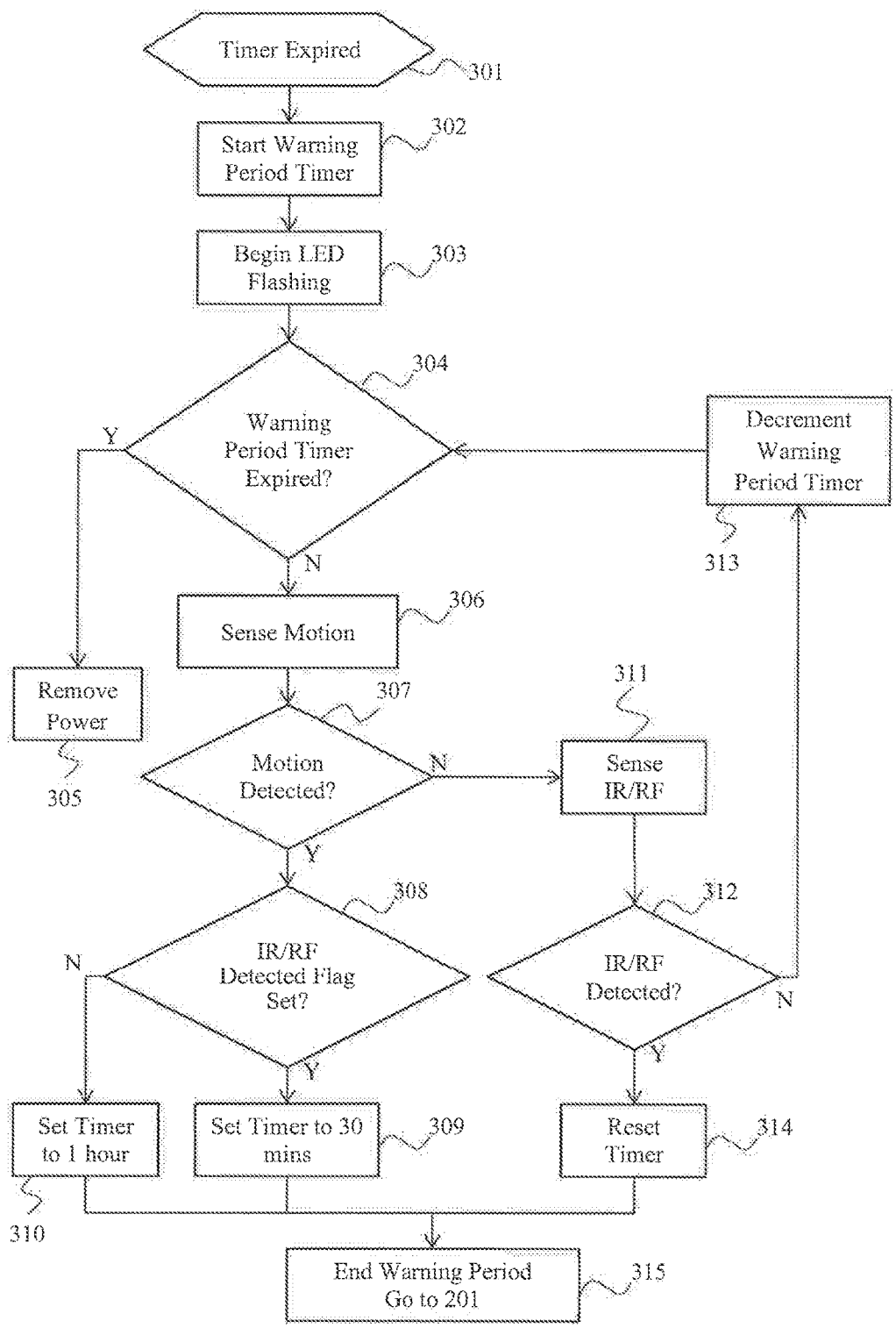
FIG. 3 shows a flowchart of the function of the invention during a warning period.

FIG. 3 then presents a flowchart of the operation of the SPC during the Shutdown Warning Period which occurs before power can be withdrawn from the controlled outlets.

When the countdown timer has expired, at step 301, the Shutdown Warning Period begins. At step 302, the Warning Period Timer is initiated. The warning period is a period of time during which a warning is supplied by the SPC which is detectable by a user of the television. The warning indicates that removal of power from the controlled outlets, and hence shutdown of the television and associated equipment, is imminent. This allows a user to identify a false positive and take action to indicate that the television is in active use, and that the user wishes to continue using the television.

The warning period timer may be initiated with any convenient value, in the illustrated in embodiment ten minutes. The shorter the warning period, the greater the chance that a false positive warning will be missed by the user, resulting in power being withdrawn from the television when the television is actually in use. The longer the warning period, the more energy is used unnecessarily when the identification of active standby is correct. Preferably, the warning period is factory set, but the warning period may be field set, either at installation or by user command.

At step 303, the warning means is commenced. In FIG. 1, the warning means is provided by a flashing LED 114, which continues to flash for the entire warning period. The warning means could additionally or alternatively take the form of a buzzer, oscillator, or other sound-emitting device. Versions of the invention where the SPC has access to the video signal to the television allow for a warning message to be provided on the television screen.

At step 304, the SPC then checks whether the warning period timer has expired. When the warning period timer has expired, the SPC operation moves to step 305. At step 305, the SPC removes power from the controlled outlets, removing power from the television and associated equipment.

Where the warning period has not expired, the SPC continues to operate occupancy sensors. In FIG. 3, this is continuing to detect motion at step 306.

The result of the motion detection is examined at step 307. If motion is detected, the value of the IR/RF Detected flag, described in the description of FIG. 2, is checked at step 308.

There are situations where a remote control or remote controls are in use which use more than one transmission technology, for example infra-red and radio frequency signals, only one of which can be detected by the SPC. An example of this is a set top box remote control which uses infra-red signalling to control power to the television, and the volume of the television, but uses radio frequency signalling for all other commands, in combination with an SPC which detects only infra-red signals. There are also situations where no remote control signal is detectable by an SPC, for example, where remote control of a television or associated device is undertaken by using an app on a smartphone or tablet device, where the SPC is unable to detect such control. There may also be situations where the SPC detects only infra-red, and the remote control uses only radio frequency communication, and situations where the SPC detects only radio frequency communications, and the television remote control uses only infra-red communication.

A lack of detection of remote control use during a viewing mode, followed by occupancy detection during the warning shutdown period, is an indicator that a communications mismatch of the aforementioned type is more likely to happen. This means that occupancy detection is likely to be the only or the primary means by which active use of the television can be detected. In these cases, occupancy detection is given more importance. This means that detection of occupancy in the absence of previous detection of remote control use can cause the countdown timer to be set to a No Remote Detected value, which is a substantial value. In general this No Remote Detected value will be less than the full initial value of the countdown timer, though it may be equal to that full initial value. This generally lesser value reflects the uncertainty that occupancy detection actually indicates that the television is in active use. In the case that remote control use detection has occurred in a viewing mode period prior to the shutdown warning period, it is more likely that a remote control, the use of which is detectable by the SPC, is in use. Thus occupancy detection in this case is less likely to be the primary means by which active use can be detected, and occupancy detection can be given a lesser importance. This occupancy detection can cause the countdown timer to be set to an Remote Detected value which is greater than the remaining warning period, but in general less than the No Remote Detected value, although it may be equal to that value. This lesser Remote Detected value reflects the uncertainty that occupancy detection actually indicates that the television is in active use.

Where the check at step 308 indicates that remote control use—in FIG. 3, infra-red or radio frequency detection—has not occurred in a previous viewing mode, then at step 310, the countdown timer is set to a No Remote Detected value, in this case, one hour. At step 315, the warning period and associated LED flashing or other warnings are terminated, and operation is then returned to step 201 of FIG. 2, with operation of the SPC continuing with motion detection.

Where the check at step 308 indicates that remote control use has occurred in a previous viewing mode, then at step 309, the countdown timer is set to a Remote Detected value, in this case, thirty minutes. At step 315, the warning period and associated LED flashing or other warnings are terminated, and operation is then returned to step 201 of FIG. 2, with operation of the SPC continuing with motion detection.

At step 307, where motion is not detected, then at step 311, sensing for remote control use takes place.

At step 312, when infra-red or radio frequency radiation associated with the use of a remote control device is detected, then at step 314, the countdown timer is reset to the initial value. At step 315, the warning period and associated LED flashing or other warnings are terminated, and operation is then returned to step 201 of FIG. 2, with operation of the SPC continuing with motion detection.

Where no remote control use has been detected at step 312, this means that no indication has been received that a user wishes to continue using the television. The warning period timer is decremented at step 313. Control returns to step 304, where a check is made as to whether the warning period timer has expired.

The warning period timer value is preferably a starting value, and the warning period timer counts down to zero. It will be clear to one skilled in the art that in other versions of the invention, the initial warning period timer value could be a terminal value, where the warning period timer is a count-up timer which starts at zero and counts up to the terminal value.

The person skilled in the art will appreciate that the order of the process steps shown in FIG. 3 is not essential to the invention. For example, the sensing of occupancy and the sensing of remote control use may occur simultaneously or in reverse order to that shown on FIG. 3. As another example, the determination of occupancy detection within an event detection block may also occur in any order, or in parallel with remote control use and occupancy sensing.

Throughout this document, where a measurement or other value is qualified by the term "about" (for example, "about 50 cm"), or by similar terms (e.g., "approximately," "roughly," etc.), this can be regarded as referring to a variation of 10% from the noted value. Thus, "about 25 feet" can be understood to mean between 22.5 and 27.5 feet.

It should be understood that the versions of the invention described above are merely exemplary, and the invention is not intended to be limited to these versions. Rather, the scope of rights to the invention is limited only by the claims set out below, and the invention encompasses all different versions that fall literally or equivalently within the scope of these claims.

What is claimed is:

1. A standby power controller including:
   a. a first sensor configured to detect a first indication of user activity;
   b. a second sensor configured to detect a second indication of user activity;
   c. a timer configured to count in time toward a selected timer value, wherein the selected timer value will both increase and decrease in response to a detection status of the first and second sensors;
   d. a switch configured to control a supply of electricity to an appliance, the switch operating to remove the supply of electricity upon the timer reaching the selected timer value;

wherein:
   (1) a visual or aural warning of impending operation of the switch is provided when the timer approaches the selected timer value to within a predefined remaining time interval, the predefined remaining time interval being a shutdown warning period;
   (2) the first sensor's detection of the first indication of user activity during the shutdown warning period causes the selected timer value to be reset to an initial value; and
   (3) the second sensor's detection of the second indication of user activity during the shutdown warning period causes the selected timer value to be adjusted by an adjustment amount, the adjustment amount being such that the time remaining until the selected timer value is reached is less than the time remaining until the selected timer value is reached when the timer is reset to the initial value.

2. The standby power controller of claim 1 wherein the first indication of user activity is use of a remote control device which controls at least some functions of the appliance, whereby the first sensor detects use of the remote control device.

3. The standby controller of claim 2 wherein the appliance is a television and the first sensor detects use of an infra-red remote control which controls the television.

4. The standby controller of claim 2 wherein the appliance is a television and the first sensor detects use of a radio frequency remote control which controls at least one of the television and a set top box providing a video signal to the television.

5. The standby power controller of claim 1 wherein the second indication of user activity is occupancy by a human of the vicinity of the appliance, whereby the second sensor detects occupancy by the human.

6. The standby power controller of claim 5 wherein the second sensor is a motion detector.

7. The standby power controller of claim 1 wherein the selected timer value is changed when one of the first and second sensors does not detect an indication of user activity, the change in the selected timer value being such that the time for the timer to reach the selected timer value is decreased.

8. The standby power controller of claim 1:
   a. further including a power sensor configured to sense the power drawn by the appliance,
   b. wherein the switch is operated to remove power from the appliance when the sensed power indicates that the appliance is in a low power standby state.

9. The standby power controller of claim 1 wherein the adjustment amount:
   a. has a first adjustment amount value where detection of the first indication of user activity by the first sensor has occurred since the standby power controller was initialized, and
   b. has a second adjustment amount value where detection of the first indication of user activity by the first sensor has not occurred since the standby power controller was initialized.

10. A standby power controller including:
    a. a switch configured to control a supply of electricity to an appliance, the switch having:
       (1) an on state wherein electricity is supplied to the appliance, and
       (2) an off state wherein electricity is not supplied to the appliance;
    b. a first sensor configured to detect use of a remote control device which controls the appliance;
    c. a second sensor configured to detect motion in the vicinity of the appliance;
    d. a timer configured to:
       (1) count in time toward a selected timer value,
       (2) when neither remote control device use nor motion in the vicinity of the appliance are detected prior to the timer attaining the selected timer value, trigger the off state of the switch;
       (3) when remote control device use is detected, restart the timer's counting in time;
       (4) when motion in the vicinity of the appliance is detected, increase the time for the counter to attain the selected timer value, the increase being less than the time for the counter to attain the selected timer value after the timer's counting is restarted.

11. The standby power controller of claim 10 wherein the switch is placed in the off state when the timer attains the selected timer value.

12. The standby power controller of claim 10 wherein the timer is further configured to restart the timer's counting in time when:
    a. the timer has counted time which approaches the selected timer value to within a predefined remaining time interval,
    b. the predefined remaining time interval is less than the selected timer value, and
    c. remote control device use is detected within the predefined remaining time interval.

13. The standby power controller of claim 12 wherein the timer is further configured to adjust the timer's count by an adjustment amount such that the time remaining until the selected timer value is reached is:
    a. greater than the predefined remaining time interval, but
    b. less than the time remaining until the selected timer value is reached when the timer is restarted,
    when motion in the vicinity of the appliance is detected within the predefined remaining time interval.

14. The standby power controller of claim 13 wherein the adjustment amount is varied if remote control device use has previously been detected by the standby power controller:
    a. has a first adjustment amount value where the first sensor detected use of a remote control device since the standby power controller was initialized, and
    b. has a second adjustment amount value where the first sensor did not detect use of a remote control device since the standby power controller was initialized.

* * * * *